(12) United States Patent
Reisdorf

(10) Patent No.: US 6,220,674 B1
(45) Date of Patent: Apr. 24, 2001

(54) COMPOSITE-LINK REAR AXLE

(75) Inventor: Klaus Reisdorf, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/193,022

(22) Filed: Nov. 16, 1998

(30) Foreign Application Priority Data

Nov. 20, 1997 (DE) .............................................. 197 51 459

(51) Int. Cl.[7] .................................................. B60B 35/00
(52) U.S. Cl. ........................................................... 301/125
(58) Field of Search ................................ 301/124.1, 123, 301/127; 280/124, 128, 153, 24.1

(56) References Cited

U.S. PATENT DOCUMENTS

| | | | |
|---|---|---|---|
| 1,133,173 | * | 3/1915 | Oehler ................................ 301/124.1 |
| 4,434,998 | | 3/1984 | Kaltwasser ............................. 280/721 |
| 4,582,338 | * | 4/1986 | Colanzi .................................. 301/125 |
| 5,129,672 | * | 7/1992 | Hiromoto et al. ................. 301/124.1 |
| 5,188,389 | * | 2/1993 | Baechler et al. .................... 301/124.1 |
| 5,409,255 | * | 4/1995 | Alatalo et al. ...................... 301/124.1 |
| 5,800,024 | * | 9/1998 | Steimmel et al. .................... 301/127 |
| 5,915,727 | * | 6/1999 | Bonnville ........................... 280/124.1 |
| 5,954,351 | * | 9/1999 | Koschinat ....................... 280/124.128 |

FOREIGN PATENT DOCUMENTS

| | | | |
|---|---|---|---|
| 3133312 | * | 3/1983 | (DE) .................................. 301/124.1 |
| 3636878 | | 10/1986 | (DE) . |
| 3818412 | | 5/1988 | (DE) . |
| 19542523 | | 5/1997 | (DE) . |
| 0136269 | | 9/1984 | (EP) . |
| 0713791 | | 11/1995 | (EP) . |

\* cited by examiner

Primary Examiner—S. Joseph Morano
Assistant Examiner—Long Bao Nguyen
(74) Attorney, Agent, or Firm—Baker Botts L.L.P.

(57) ABSTRACT

A composite-link rear axle has a flexurally rigid and torsionally resilient transverse member with a longitudinal member connected to it at each end by a plug connection, each longitudinal member being designed to receive a wheel carrier at one end and for articulation a vehicle body at the other end. The torsional rigidity of the transverse member and therefore the stabilizer effect are reduced by providing the plug connection with a sliding guide so that slight displacement of the transverse member in its longitudinal direction corresponding to the vehicle transverse axis with respect to the longitudinal member is possible in the region of the plug connection.

18 Claims, 2 Drawing Sheets

COMPOSITE-LINK REAR AXLE

BACKGROUND OF THE INVENTION

This invention relates to composite-link rear axle arrangements having a flexurally rigid and torsionally resilient transverse member and a longitudinal member attached to each end of the transverse member by a plug connection in which each longitudinal member is adapted to receive a wheel carrier at one end and to be articulated to a vehicle body at the other end.

A conventional composite-link rear axle arrangement disclosed in German Offenleguengsschrift No. 44 41 971 has a transverse member and two longitudinal members which are attached to the respective opposite ends of the transverse member. In this arrangement, the longitudinal members are appropriately designed at one end to receive a wheel carrier and at the other end for articulation to a vehicle body. In addition, the transverse member is designed to be flexurally rigid but torsionally resilient and the longitudinal members are connected to the transverse member so that a stabilizer effect can be achieved with respect to the compression and expansion movements of the wheels, permitting the transverse and longitudinal forces acting on the vehicle wheels to be absorbed by the entire composite-link rear axle. Usually, the transverse member and each longitudinal member are produced from an aluminum alloy, the opposite ends of the transverse member being plugged into corresponding recesses in the longitudinal members which are provided for this purpose. The plug connections thus made between the transverse member and the longitudinal members are then rigidly attached by an appropriate method such as by adhesive bonding, welding, riveting or appropriate shaping. This attachment technique may vary depending, in particular, on whether the transverse member is designed, for example, as an extruded part with a semi-open profile and whether the longitudinal member is a casting or has a ribbed extruded shape.

Such conventional composite-link rear axle arrangements do not have the best possible design. In general, the outer regions of the transverse member are designed so that they are received in a groove-like guide of the corresponding longitudinal member. Since the traverse member is made of a light metal having a substantially lower modulus of elasticity than that of steel, the flange width of the light-metal profile of the transverse member must be extremely large in the outer region if a predetermined torsional rigidity is to be ensured. Consequently, when torsion occurs in use there is a correspondingly pronounced cambering of the outer regions of the transverse member flange regions. This cambering causes the outer flange regions of the transverse member to be displaced in the direction transverse to the vehicle, referred to herein as a Y axis displacement, which is sometimes very pronounced. Since the outer regions of the transverse member which are plugged into the longitudinal member are generally firmly clamped in the direction of the vehicle transverse axis i.e., the Y-direction, by a welded joint, or by screws, or the like, the torsional rigidity of the transverse member is increased undesirably. The result is that, because of this high rigidity, the stabilizer effect to be achieved is likewise too high.

SUMMARY OF THE INVENTION

Accordingly, it is an object of the present invention to provide a composite-link rear axle arrangement for a motor vehicle which overcomes disadvantages of the prior art.

Another object of this invention is to provide a composite-link rear axle arrangement in which the torsional rigidity of the transverse member is reduced and the resulting stabilizer effect correspondingly reduced.

These and other objects of the invention are attained by providing a composite link rear axle arrangement having a plug connection between a transverse member and a longitudinal member which includes a sliding bearing so that slight displacement of the transverse member, essentially in its longitudinal direction corresponding to the vehicle transverse axis, is possible in the region of the plug connection. Because the plug connection allows a slight sliding movement of the outer regions of the transverse member in the direction of the vehicle transverse axis, the torsional rigidity of the transverse member is reduced and, consequently, the stabilizer effect is likewise reduced to an appropriate amount. A slight sliding movement of the outer regions of the transverse member in the direction of the vehicle transverse axis i.e., the Y-direction, thus makes it possible to avoid the above-mentioned disadvantages after prior art.

There are a large number of possibilities for designing and developing a composite-link rear axle according to the invention in an advantageous way.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
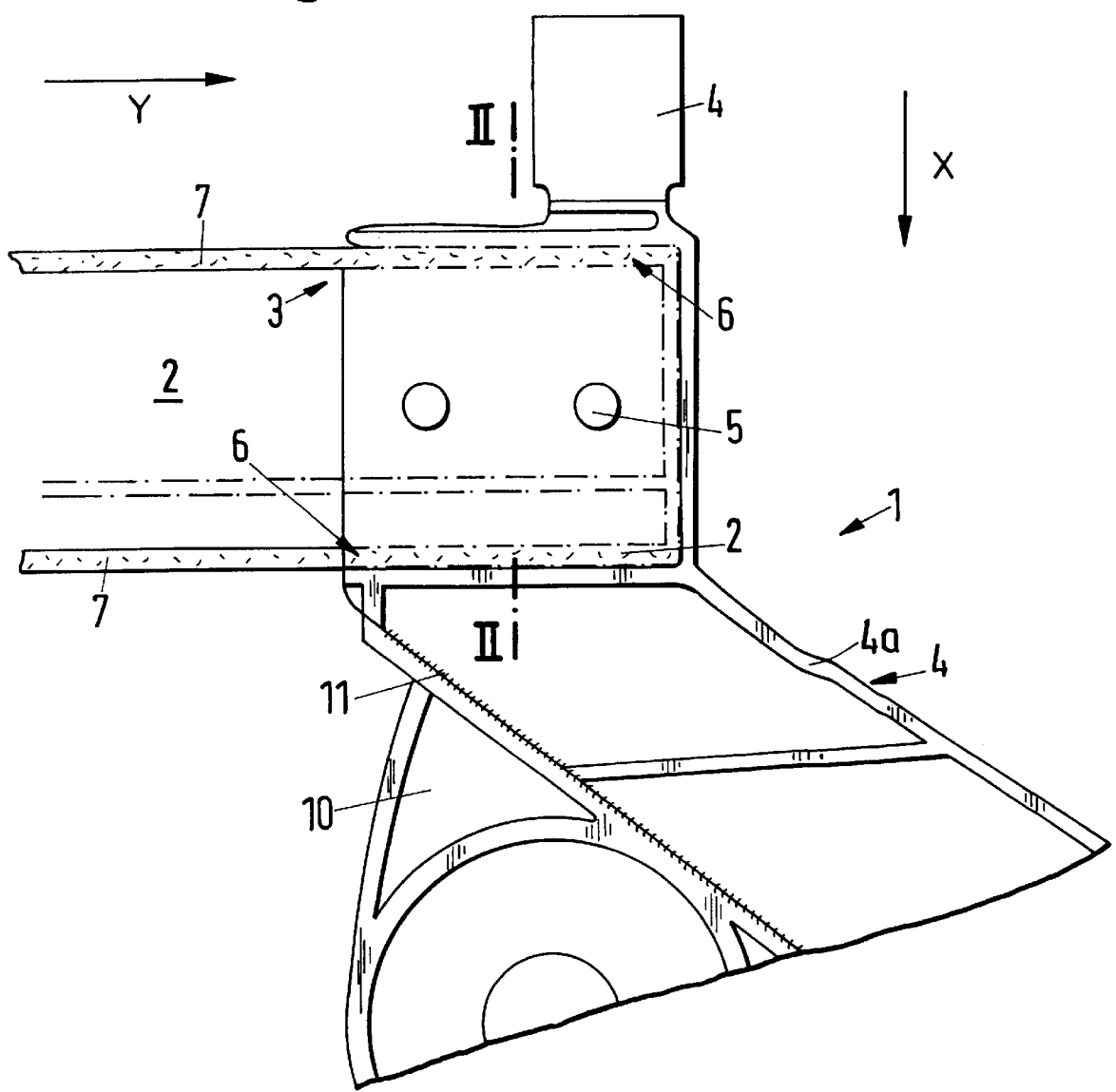
FIG. 1 is a partial plan view showing a representative embodiment of a composite-link rear axle according to the invention.

In the typical embodiment of the invention shown in the drawings, a composite-link rear axle 1 includes a flexurally rigid and torsionally resilient transverse member 2 with a longitudinal member 4, only partially illustrated, connected at each end of the transverse member 2 by a plug connection 3. Each longitudinal member 4 is designed so that one end is suitable for receiving a wheel carrier, not shown in detail, and the other end 4a can be articulated to a vehicle body. The transverse member 2 is designed to be flexurally rigid but torsionally resilient so that it rigidly resists transverse or longitudinal forces exerted on the wheels, but acts in the same way as a stabilizer with respect to compression and expansion forces applied in the vertical direction of the vehicle.

For this purpose the plug connection 3 is provided with a sliding bearing so that a slight displacement of the transverse member 2, essentially in its longitudinal direction corresponding to the transverse axis of the vehicle, is possible in the region of the plug connection 3. With a sliding bearing in the plug connection 3, the disadvantages of the prior art as described above can be avoided so that the torsional rigidity of the transverse member 2 is reduced and the stabilizer effect achieved as the ultimate outcome is also reduced. A system of coordinates may be used to illustrate the corresponding directions of movement, the X-direction being intended to indicate the direction of vehicle travel, the Y-direction being the longitudinal direction of the vehicle transverse axis and the Z-direction being the vertical direction.

In principle, the transverse member 2 and each longitudinal member 4 are produced from light metal or a light-metal alloy, preferably aluminum or an aluminum alloy. Both the transverse member 2 and the longitudinal member 4 may be made as an extruded part.

Figure 2:
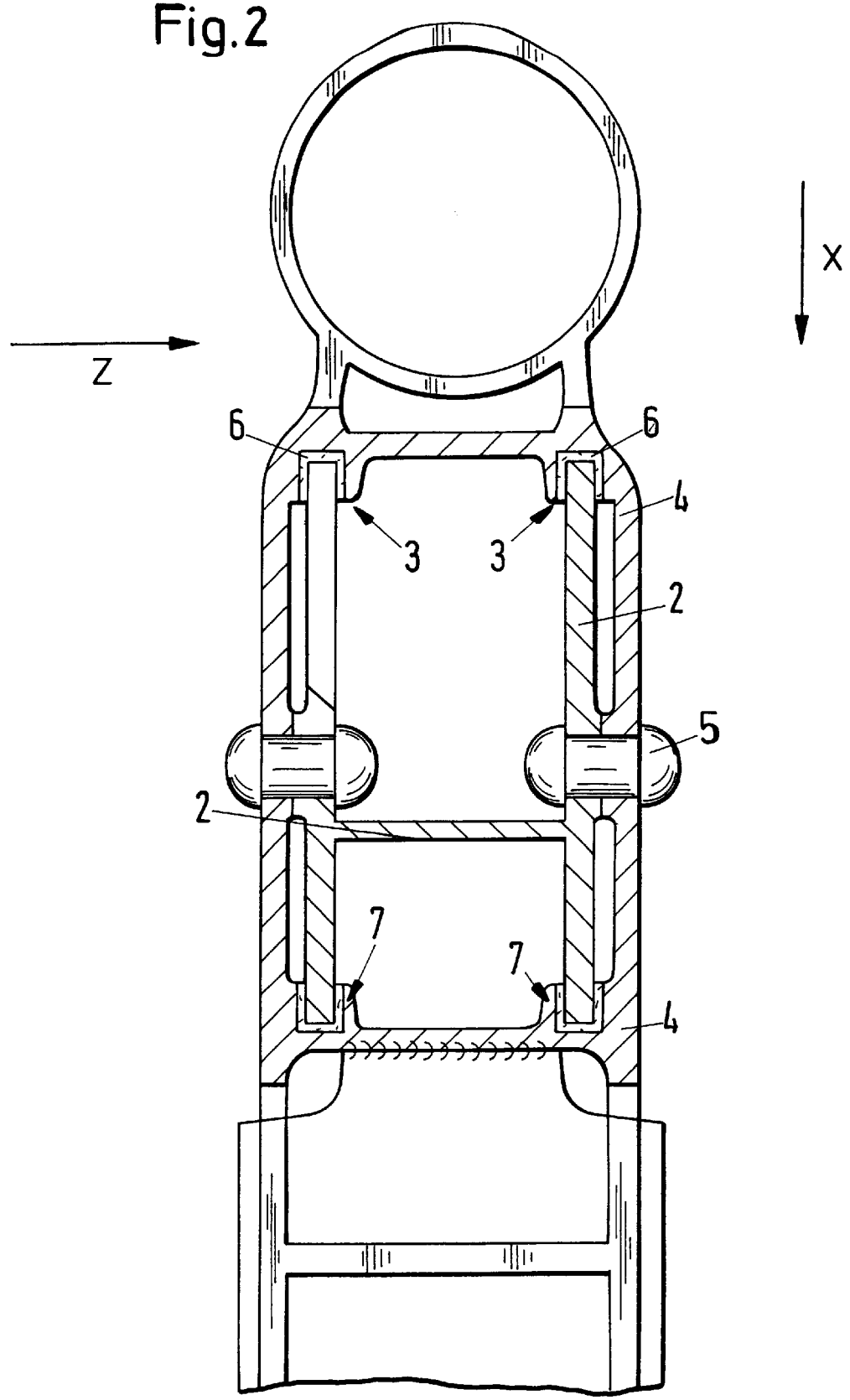
FIG. 2 is a cross-sectional view taken along the line II—II in FIG. 1.

In order to ensure a reliable plug connection between the transverse member 2 and the longitudinal member 4, at least one fixed connection 5 joining the transverse member 2 and the longitudinal member 4 at a particular point is additionally provided in the region of the plug connection 3. FIG. 2 shows that the connection 5 acting at a particular point in the illustrated example is a riveted joint.

A screw connection is also possible as a fixed connection at a particular point between the transverse member 2 and the longitudinal member 4. It is important, however, that the fixed connection 5 acting at a particular point should not fix the transverse member 2 in the Y-direction and that movement of the outer regions of the transverse member 2 in the Y-direction is still possible so that a sliding mounting is implemented.

As is evident both from FIG. 1 and from FIG. 2, in the illustrated example the transverse member 2 is plugged into the longitudinal member 4.

At best seen in FIG. 2, the transverse member 2 has a double-T cross-sectional shape at least in the region of the plug connection 3. Other configurations of the transverse member 2 are also perfectly possible. In order to make the plug connection 3, it is important in this example that the transverse member 2 has at least one first guide face and the longitudinal member 4 has at least one second guide face so that a sliding mounting along the guide faces can be provided. For example, the longitudinal member 4 may have a corresponding groove to receive the outer region of the transverse member 2, so that at least one second guide face is thereby formed.

In the preferred embodiment of the plug connection 3 shown in FIG. 2, the longitudinal member 4 has a plurality of grooves 6 corresponding to the double-T profile of the transverse member 2. The first guide faces of the transverse member 2 are consequently formed by the corresponding outer faces of the double-T profile of the transverse member 2. The second guide faces of the corresponding longitudinal member 4 are provided by the surfaces of the corresponding grooves 6. For the sliding mounting to be implemented, the first and/or the second guide face may have a coating 7 which facilitates sliding. In the preferred exemplary embodiment, the coating 7 is a Teflon polytetrafluoroethylene coating. In this case, at least that portion of the T-profile of the transverse member 2 which corresponds to the grooves 6 is provided with a coating 7, preferably a Teflon coating. It is also possible for the grooves 6 or the surfaces of the grooves 6 to be provided with a corresponding coating 7, preferably a Teflon coating. The use of such coating may vary depending on the use and an appropriate combination of coatings is also possible.

In the embodiment shown in FIG. 1, the longitudinal link is a casting which has a U-shaped cross-section. In this case, the part 4a shown at the bottom of FIG. 1 extends vertically, while the open profile, located on the left in FIG. 1, receives the transverse member in the upper region and is closed by a spring support plate 10 connected by a weld seam 11 in the lower region.

In this way, a robust composite-link rear axle can be produced reliably in a cost-effective manner essentially from three aluminum extrusions, providing the advantages described above.

Appropriate slidability is achieved by providing the sliding mounting with a Teflon coating. It is then possible for the groove-like guide to firmly resist forces applied in the direction of the X-axis and Z-axis only. The riveting serves complementarily or additionally for the overall support of all the moments and forces introduced. It is possible, by designing the plug connection 3 in this way, to dispense with a welded joint in these critical regions, since welds provided weak points particularly in the case of light metals.

Although the invention has been described herein with reference to specific embodiments many modifications and variations therein will readily occur to those skilled in the art. Accordingly, all such variations and modifications are included within the intended scope of the invention.

I claim:

1. A composite-link rear axle for a vehicle comprising:
   a flexurally rigid and torsionally resilient transverse member extending in a longitudinal direction corresponding to a transverse direction of the vehicle and having two ends;
   two longitudinal members, each connected by a plug connection to a corresponding end of the transverse member and each being arranged to receive a wheel carrier at one end and being adapted for articulated connection to a vehicle body at a second end; and
   the plug connection being formed with a sliding bearing permitting sliding motion in the longitudinal direction of the transverse member between the transverse member and the corresponding longitudinal member in the region of the plug connection.

2. A composite-link rear axle according to claim 4 wherein the transverse member and the longitudinal members are made of a light metal or a light-metal alloy.

3. A composite-link rear axle according to claim 2 wherein the transverse members and the longitudinal members are made of aluminum or an aluminum alloy.

4. A composite-link axle for a vehicle comprising:
   a flexurally rigid and torsionally resilient transverse member extending in a longitudinal direction corresponding to a transverse direction of the vehicle and having two ends;
   two longitudinal members, each connected by a plug connection to a corresponding end of the transverse member and each being arranged to receive a wheel carrier at one end and being adapted for articulated connection to a vehicle body at a second end; and
   the plug connection being formed with a sliding bearing permitting sliding motion in the longitudinal direction of the transverse member between the transverse member and the corresponding longitudinal member in the region of the plug connection, wherein at least one fixed connection between the transverse member and the longitudinal member which permits sliding motion in the longitudinal direction of the transverse member is additionally provided in the region of each plug connection.

5. A composite-link rear axle according to claim 4 wherein the fixed connection is a riveted joint.

6. A composite-link rear axle according to claim 4 wherein the fixed connection is a screw connection.

7. A composite-link rear axle according to claim 4 wherein the transverse member is an extruded part.

8. A composite-link rear axle according to claim 4 wherein each longitudinal member is an extruded part.

9. A composite-link rear axle according to claim 4 wherein each longitudinal member is a casting.

10. A composite-link rear axle according to claim 4 wherein the transverse member is plugged into each longitudinal member.

11. A composite-link rear axle for a vehicle comprising:

a flexurally rigid and torsionally resilient transverse member extending in a longitudinal direction corresponding to a transverse direction of the vehicle and having two ends;

two longitudinal members, each connected by a plug connection to a corresponding end of the transverse member and each being arranged to receive a wheel carrier at one end and being adapted for articulated connection to a vehicle body at a second end; and the plug connection being formed with a sliding bearing permitting sliding motion in the longitudinal direction of the transverse member between the transverse member and the corresponding longitudinal member in the region of the plug connection, wherein the transverse member has a double-T cross-sectional shape in the region of the plug connection.

12. A composite-link rear axle according to claim 4 wherein the plug connection includes at least one first guide face on the transverse member and at least one second guide face on the longitudinal member.

13. A composite-link rear axle for a vehicle comprising:

a flexurally rigid and torsionally resilient transverse member extending in a longitudinal direction corresponding to a transverse direction of the vehicle and having two ends;

two longitudinal members, each connected by a plug connection to a corresponding end of the transverse member and each being arranged to receive a wheel carrier at one end and being adapted for articulated connection to a vehicle body at a second end; and the plug connection being formed with a sliding bearing permitting sliding motion in the longitudinal direction of the transverse member between the transverse member and the corresponding longitudinal member in the region of the plug connection, wherein the plug connection includes at least one first guide face on the transverse member and at least one second guide face on the longitudinal member and wherein the longitudinal member has a groove forming at least one second guide face.

14. A composite-link rear axle according to claim 11 wherein each longitudinal member has a plurality of grooves corresponding to the double-T cross-sectional shape of the transverse member.

15. A composite-link rear axle according to claim 12 wherein at least one of the first and second guide faces has a coating which facilitates a sliding mounting.

16. A composite-link rear axle according to claim 15 wherein the coating is a polytetrafluoroethylene coating.

17. A composite-link rear axle according to claim 14 wherein the grooves are provided with a polytetrafluoroethylene coating.

18. A composite-link rear axle according to claim 14 wherein at least the regions of the T-profile cross-section of the transverse member which are received in the grooves are provided with a polytetrafluoroethylene coating.

* * * * *